United States Patent [19]

Chabot

[11] Patent Number: 5,005,314
[45] Date of Patent: Apr. 9, 1991

[54] SAP COLLECTING DEVICE

[75] Inventor: Jean-Marie Chabot, St. Damien, Canada

[73] Assignee: IPL, Inc., St-Damien, Canada

[21] Appl. No.: 434,216

[22] Filed: Nov. 13, 1989

[51] Int. Cl.$^5$ .......................... A01G 23/10; F24J 3/02
[52] U.S. Cl. ......................................... 47/50; 138/32; 126/417
[58] Field of Search ...................... 47/50–54, 47/10, 11; 138/32, 35; 126/417, 471.1

[56] References Cited

U.S. PATENT DOCUMENTS 4,202,322  5/1980  Delgado et al. ............... 126/417
4,325,359  4/1982  Fries ................................. 126/417

FOREIGN PATENT DOCUMENTS 652576   3/1959  Canada ............................ 47/50
1096637  3/1981  Canada ............................ 47/

Primary Examiner—David A. Scherbel
Assistant Examiner—Michele A. Van Patten
Attorney, Agent, or Firm—James R. Longacre; John M. White

[57] ABSTRACT

The disclosure herein describes a device for use in conducting sap collected from maple trees to a sap-processing unit, particularly during sunny days; it comprises a tubular member in which sap is contained and conveyed to the sap-processing unit and a parasol mounted exteriorly of the tubular member for preventing high angled sun rays to be absorbed in the tubular member and to affect the sap flowing during the day but allowing low angled sun rays to be absorbed in part of the tubular member to allow frozen sap to defreeze and flow in the morning. The parasol consists of a semi-cylindrical elongated member mounted over the tubular member and is spaced therefore so as to define an air chamber between the tubular member and the semi-cylindrical member.

6 Claims, 2 Drawing Sheets

SAP COLLECTING DEVICE

FIELD OF THE INVENTION

The present invention relates to a sap conducting device, particularly useful during sunny days.

BACKGROUND OF THE INVENTION

Sap-collecting systems for maple trees consist of a network of connectors and conductors that operate under vacuum conditions to suck sap from the trees and direct it to a central sap-processing unit. These conductors consist of small conduits connecting the trees to tubular members of larger diameter (called mains) bringing the sap to the central unit. When the sun goes down and the temperature lowers, the sap that remains in the mains freezes. It is only when the temperature rises again above 32° F. that the sap will defreeze and the sap collecting and conducting process will carry on.

In order to obtain as much sap as possible, conduits of dark color (black) are used so that sun rays may be absorbed early in the morning to assist in the defreezing process of sap contained in the mains. The earlier the sap will start to flow in the network, the larger the quantity of sap collected.

However, one main disadvantage of black conduits is that sap temperature can rise up to 70° F. with high noon sun rays. At 70° F. temperature, bacterial growth is favored to an important degree, causing the resulting syrop to be darker and of a lesser quality than that desired. On the other hand, if light-shaded colored (white) conduits are used, the sap defreezing process may be delayed up to two hours comparatively to black conductors. Still, because the sap temperature is maintained lower than with black conduits, the sap collected, although of a small quantity, is of a higher quality.

There are, therefore, advantages and disadvantages associated with both colors of conductors.

OBJECTS AND STATEMENT OF THE INVENTION

It is an object of the present invention to provide a device for use in the conducting of sap to a sap-processing unit which combines the advantages of both shades of conduits in one system while avoiding most of their disadvantages.

The present invention, therefore, comprises a device for use in conducting sap collected from maple trees to a sap-processing unit, particularly during sunny days, which comprises:

a tubular member in which sap is contained and conveyed to the sap processing unit; and means mounted exteriorly on said tubular member for preventing high angled sun rays to be absorbed in the tubular member but allowing low angled rays to be absorbed in part of the tubular member for defreezing sap contained in frozen state in the tubular member.

In one embodiment, the exteriorly mounted means consists of a semi-cylindrical elongated member mounted over the tubular member. It is spaced from the tubular member so as to define an air chamber therebetween.

In another embodiment, the device uses the wire which supports the conduits overground as a spacer between the tubular member and the semi-cylindrical member to define the air chamber.

In a further embodiment, the semi-cylindrical member is of a light-shaded color while the tubular member is of a dark-shaded color.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

DESCRIPTION OF PREFERRED EMBODIMENTS

Figure 1:
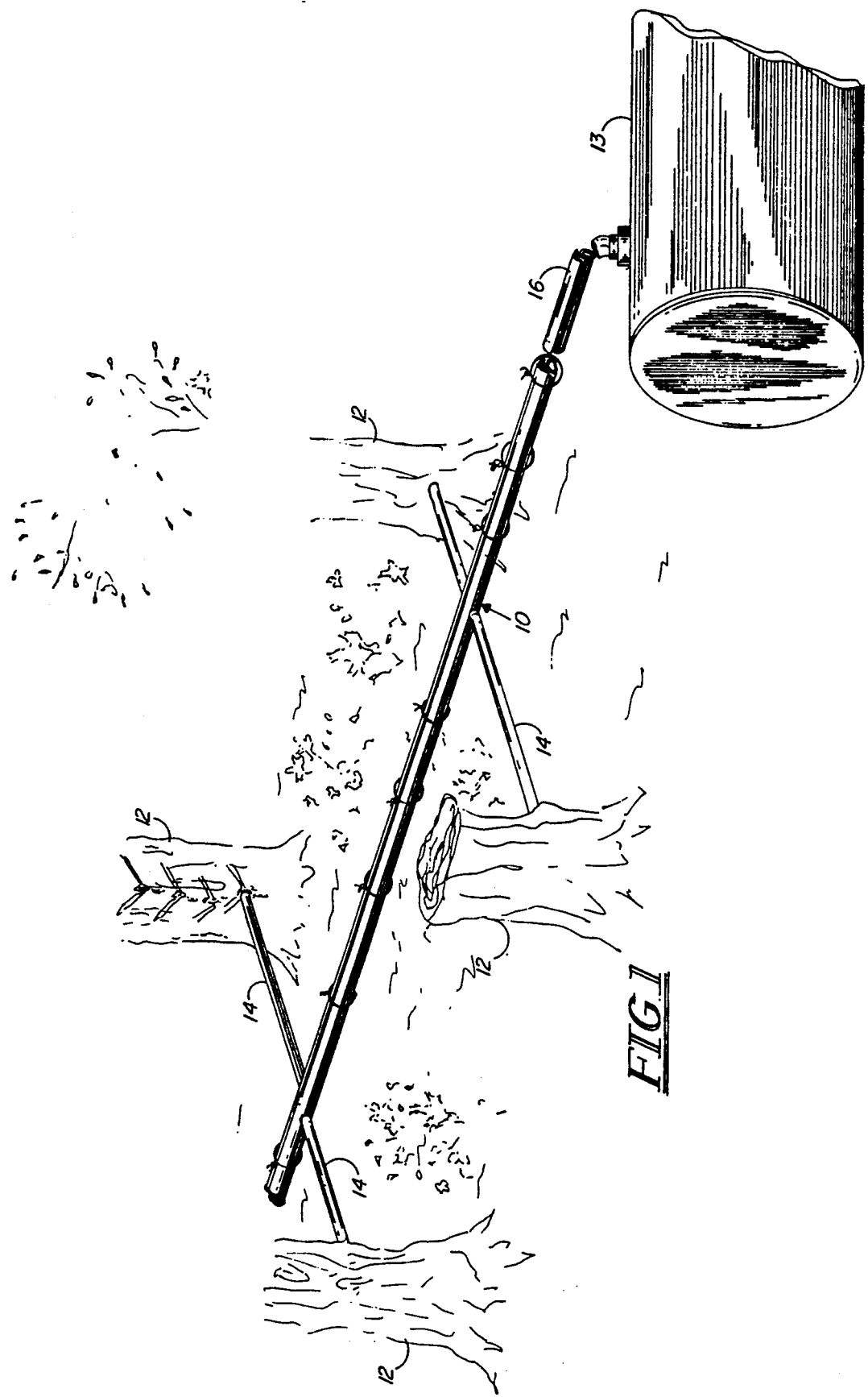
FIG. 1 is a schematic perspective view of a network of conduits for collecting sap from maple trees and for conducting same to a central processing unit.

Referring to FIG. 1, there is shown a network of collectors and conductors for collecting sap from trees 12 and directing it to a central processing unit (not shown) which is usually equipped with a large tank 13 for containing the sap collected. The network comprises a plurality of small conduits 14 which have one end tapped to the trees by means of appropriate connectors (not shown) and the other end to a larger conduit on main 16 which is connected to the sap tank 13.

Figure 2:
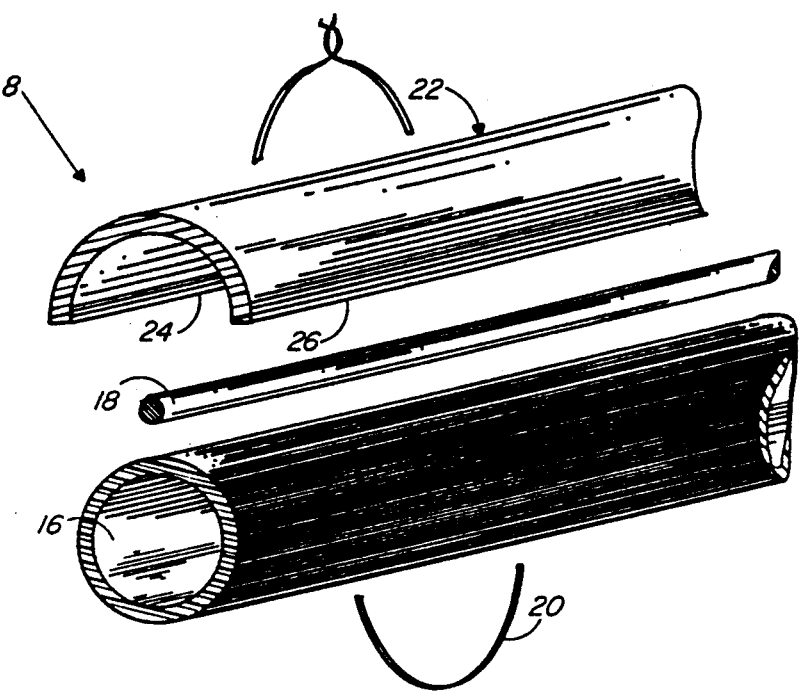
FIG. 2 is an exploded view of a device made in accordance with the present invention.

Referring to FIG. 2, the main 16 is a tubular member which is suspended overground by a wire 18 and is connected thereto by a series of longitudinally spaced clips or similar fastening means 20.

Figure 3:
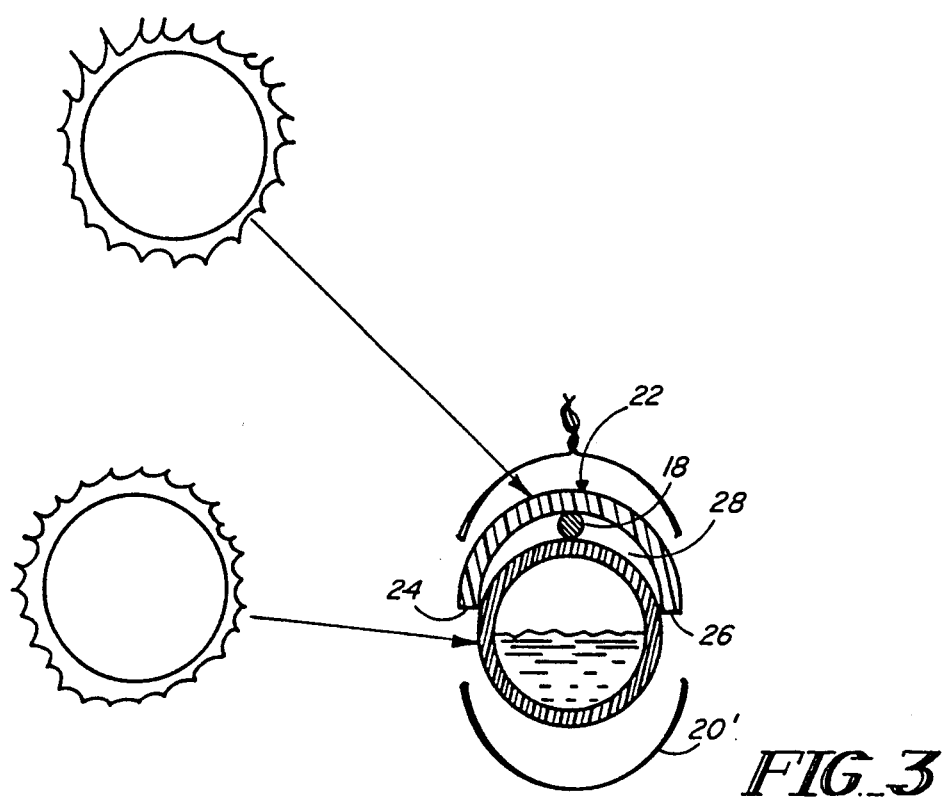
FIG. 3 is a transverse cross-sectional view of the device in which sap is contained.

The present invention consists in providing a parasol-like member 22 over the tubular main 16. The parasol is in the shape of elongated semi-cylindrical member which is adapted to fit over the top half of the main as illustrated in FIG. 3. The mounting of the parasol 22 may be a tight fit of its opposite side edges 24 and 26 onto the exterior surface of the main 16 or the use of clips to surround the outside surface of the parasol 22 (see clip 20' in FIG. 3).

The presence of the suspending wire 18 between the tubular member 16 and the semi-cylindrical member 22 defines an air chamber 28 which increases the insulating capacity of the parasol.

As can be seen in FIG. 3, the provision of a semi-cylindrical member over the tubular member allows the sun rays of the early morning sun to be absorbed in the bottom half wall of the tubular member 16 while, on the other hand, the high noon sun rays bypass main 16 and are refracted on the parasol 22.

In one preferred form of the invention, the parasol is of a light-shaded color, such as white, which assists in the reflection of the hot high noon sun rays; this, in combination with the air chamber 28, ensures that the temperature inside the conductor is maintained low.

It has also been found preferable to make the main of a dark-shaded color, such as black, to assist in the absorption of the early morning sun rays.

In mounting the semi-cylindrical white parasol on the main in the manners described above, it can be oriented circumferentially thereon so that an optimum position may be given for obtaining a more or less insulating effect with respect to the angle of the sun rays.

Therefore, with the present invention, the advantages of both colors are used: i.e. black to begin the defreezing process of the sap in the morning and white, to maintain the quality of the sap during the flowing process when the sun angle is higher.

Although the invention has been described above in relation to one form, it will be evident to the person skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. A device for use in conducting sap collected from maple trees to a sap-processing unit, particularly during sunny days, comprising;

a tubular member in which sap is contained and conveyed to the sap-processing unit; and means mounted exteriorly on said tubular member for preventing high angled sun rays to be absorbed in said tubular member but allowing low angled sun rays to be absorbed in part of said tubular member for defreezing sap contained in frozen state in said tubular member.

2. A device as defined in claim 1, wherein said exteriorly mounted means consists of a semi-cylindrical elongated member mounted over said tubular member.

3. A device as defined in claim 2, wherein said semi-cylindrical is spaced above said tubular member so as to define an air chamber between said tubular member and said semi-cylindrical member.

4. A device as defined in claim 3, further comprising a wire for supporting said tubular member between maple trees and a sap-processing unit; said wire is being mounted to said tubular member and said semi-cylindrical member resting on said wire so as to define said air chamber.

5. A device as defined in claim 2, wherein said semi-cylindrical member is of light-shaded color and wherein tubular member is of dark-shaded color.

6. A device as defined in claim 2, wherein said tubular member and said semi-cylindrical member are formed of plastic material.

* * * * *